(12) United States Patent
Asahara et al.

(10) Patent No.: US 8,044,151 B2
(45) Date of Patent: Oct. 25, 2011

(54) WHOLLY AROMATIC LIQUID-CRYSTALLINE POLYESTER

(75) Inventors: Motoki Asahara, Osaka (JP); Hiroaki Terada, Osaka (JP); Hiroyuki Kato, Osaka (JP)

(73) Assignee: Ueno Fine Chemicals Industry, Ltd., Osaka-Fu (JP)

( * ) Notice: Subject to any disclaimer, the term of this patent is extended or adjusted under 35 U.S.C. 154(b) by 246 days.

(21) Appl. No.: 12/260,428

(22) Filed: Oct. 29, 2008

(65) Prior Publication Data

US 2009/0111964 A1    Apr. 30, 2009

(30) Foreign Application Priority Data

Oct. 30, 2007    (JP) ................................. 2007-281825

(51) Int. Cl.
*C08G 63/08*    (2006.01)
(52) U.S. Cl. .......... 525/450; 528/125; 528/86; 528/176; 528/193; 528/128; 528/194
(58) Field of Classification Search .................. 528/125, 528/86, 176, 193, 194, 128; 525/450
See application file for complete search history.

(56) References Cited

U.S. PATENT DOCUMENTS

| | | | |
|---|---|---|---|
| 2004/0152865 A1 | 8/2004 | Okamoto et al. | |
| 2004/0164282 A1 | 8/2004 | Okamoto et al. | |
| 2005/0256291 A1* | 11/2005 | Okamoto et al. | ............. 528/272 |

FOREIGN PATENT DOCUMENTS

JP    2007-154169 A    6/2007

* cited by examiner

*Primary Examiner* — Randy Gulakowski
*Assistant Examiner* — Shane Fang

(74) *Attorney, Agent, or Firm* — Sughrue Mion, PLLC

(57) ABSTRACT

The present invention provides a wholly aromatic liquid-crystalline polyester consisting of the repeating units represented by formulae (I), (II), (III) and (IV):

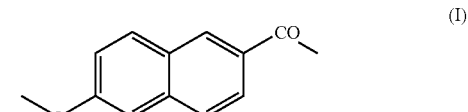

(I)

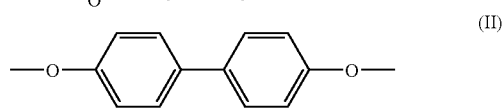

(II)

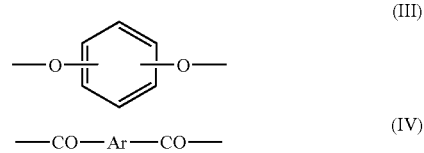

(III)

—CO—Ar—CO—

(IV)

wherein:
the molar proportion of the repeating unit represented by formula (I) based on the total repeating units constituting the wholly aromatic liquid-crystalline polyester is 40-80 mol %;
the molar ratio of the total amount of the repeating units represented by formulae (II) and (III) to the repeating unit represented by formula (IV) is from 90/100 to 100/90;
the molar proportion of the repeating unit represented by formula (II) based on the total amount of the repeating units represented by formulae (II) and (III) is 80-99.9 mol%; and
the two "—O—" attached to the benzene ring in formula (III) are positioned meta or para to each other and "Ar" in formula (IV) represents a bivalent aromatic group.
The wholly aromatic liquid-crystalline polyester of the present invention exhibits excellent dielectric properties in high frequency regions as well as good mechanical properties such as impact strength.

9 Claims, 1 Drawing Sheet

WHOLLY AROMATIC LIQUID-CRYSTALLINE POLYESTER

TECHNICAL FIELD

The present invention relates to a wholly aromatic liquid-crystalline polyester which exhibits good mechanical properties and excellent dielectric properties in high frequency regions.

BACKGROUND ART

In modern societies, multimedia in daily life is rapidly developing and ITS (Intelligent Transport Systems) such as ETC device used in toll roads and GPS becomes widely used. In order to treat the extraordinary increase of information and telecommunications technologies, the frequency of signals used for the transmission is becoming higher.

As material used for the information communication devices employing such a high frequency, engineering plastics which exhibit excellent dielectric properties in high frequency regions (especially in gigahertz bands) attract attention. The engineering plastics also exhibit good productivities and lightweight properties and therefore, they are expected to be applied for chassis and package of communication devices and electronic devices as well as for dielectric body and the like.

Among the engineering plastics, thermotropic liquid-crystalline polyester resin (which is called as liquid-crystalline polyester resin or LCP hereinafter) has the following excellent properties and is especially expected to be suitable for manufacturing devices which use high frequency signals:
(1) excellent dielectric properties: the relative permittivity ($\in$r) is constant in the frequency regions employed and dielectric loss tangent (tan δ) is small,
(2) good physicalities: mechanical properties including low-expansion property (dimensional stability), heat resistance, flame retardancy and rigidity are good, and
(3) good molding flowability: which allows processing of molded articles having down-sizing and thinner parts.

Among the liquid-crystalline polyester resins, wholly aromatic liquid-crystalline polyesters comprising 6-oxy-2-naphthoyl repeating unit, 4,4'-dioxybiphenyl repeating unit and aromatic dicarbonyl repeating unit in certain proportions are recently proposed because they exhibit good dielectric properties, heat resistance and molding processability (see US Patent Application Publication No. 2004-152865 and US Patent Application Publication No. 2004-164282).

The liquid-crystalline polyesters disclosed in the above two references and Japanese Patent Application laid open No. 2007-154169 include a great amount of 6-oxy-2-naphthoyl repeating unit. Though such liquid-crystalline polyesters exhibit excellent dielectric properties, their mechanical properties such as impact strength are relatively poor.

Accordingly, a wholly aromatic liquid-crystalline polyester resin which exhibits excellent dielectric properties as well as good mechanical properties such as impact strength is desired.

SUMMARY OF THE INVENTION

An object of the present invention is to provide a wholly aromatic liquid-crystalline polyester which exhibits excellent dielectric properties in high frequency regions as well as good mechanical properties such as impact strength.

The present inventors found that a wholly aromatic liquid-crystalline polyester which comprises 6-oxy-2-naphthoyl repeating unit, 4,4'-dioxybiphenyl repeating unit and aromatic dicarbonyl repeating unit in a certain proportion and further comprises a small amount of benzenedioxy repeating unit exhibits excellent dielectric properties and improved mechanical properties such as impact strength.

The present invention provides a wholly aromatic liquid-crystalline polyester consisting of the repeating units represented by formulae (I), (II), (III) and (IV):

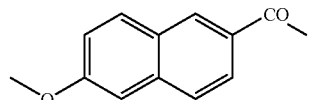

(I)

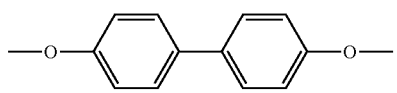

(II)

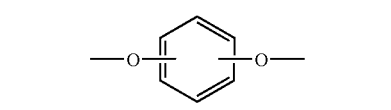

(III)

—CO—Ar—CO— (IV)

wherein:
the molar proportion of the repeating unit represented by formula (I) based on the total repeating units constituting the wholly aromatic liquid-crystalline polyester is 40-80 mol %;
the molar ratio of the total amount of the repeating units represented by formulae (II) and (III) to the repeating unit represented by formula (IV) is from 90/100 to 100/90;
the molar proportion of the repeating unit represented by formula (II) based on the total amount of the repeating units represented by formulae (II) and (III) is 80-99.9 mol %; and
the two "—O—" attached to the benzene ring in formula (III) are positioned meta or para to each other and "Ar" in formula (IV) represents a bivalent aromatic group.

DETAILED DESCRIPTION OF THE PREFERRED EMBODIMENTS

Figure 1:
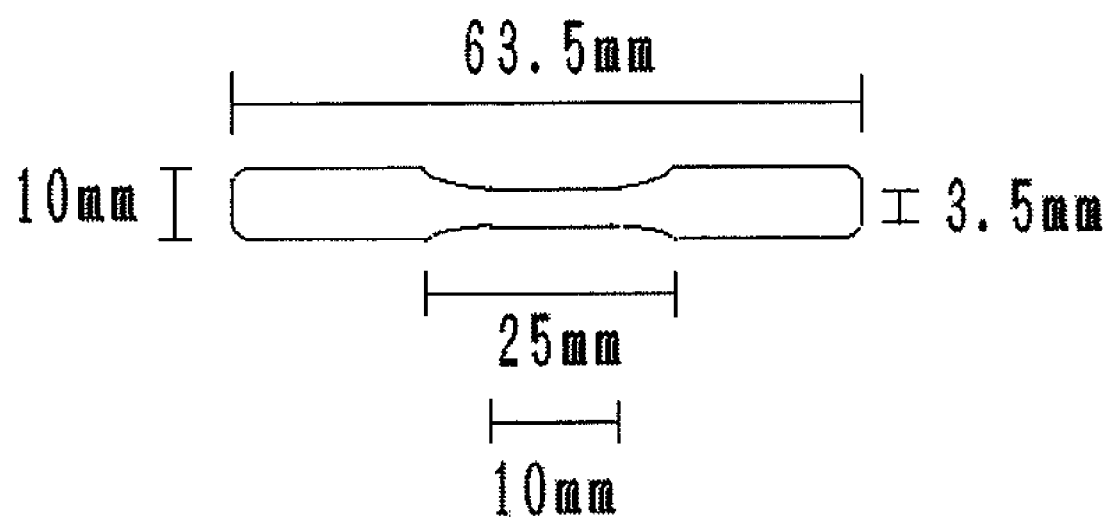
FIG. 1 is a schematic representation of the dumbbell-shaped specimen used for the tensile strength test.

In the specification and claims, the term "aromatic" represents a group having an aromatic group comprising up to four rings. "Aromatic" group may be 6-membered monocyclic or polycyclic fused cyclic group. "Aromatic" group also includes a group wherein two or more 6-membered monocyclic or polycyclic fused cyclic groups are linked by at least one linking group which is selected from the group consisting of carbon-carbon bond, oxy, C1-6 alkylene, amino, carbonyl, sulfide, sulfinyl and sulfonyl group.

In the specification and claims, the term "wholly aromatic liquid-crystalline polyester" refers to a wholly aromatic liquid-crystalline polyester which exhibits anisotropic melt phase and is called as thermotropic liquid-crystalline polyester by those skilled in the art.

The anisotropic melt phase can be confirmed by means of conventional polarized light system using orthogonal light polarizer. In more detail, the sample on the hot stage under nitrogen atmosphere may be observed.

The wholly aromatic liquid-crystalline polyester of the present invention consists of repeating units represented by the following formulae (I) to (IV):

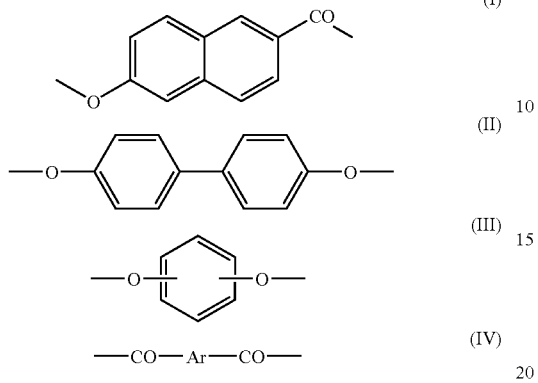

wherein the two "—O—" attached to the benzene ring in formula (III) are positioned meta or para to each other and "Ar" in formula (IV) represents a bivalent aromatic group.

The wholly aromatic liquid-crystalline polyester consisting of the above described repeating units may include both of those give anisotropic melt phase and those do not, depending on structural components of the polyester, and ratio and sequence distribution of the components. The wholly aromatic liquid-crystalline polyester of the present invention is limited to those exhibit anisotropic melt phase.

Examples of monomers which provide the repeating unit represented by formula (I) are 6-hydroxy-2-naphthoic acid as well as ester forming derivatives such as acyl derivatives, ester derivatives and acid halide thereof.

In the wholly aromatic liquid-crystalline polyester of the present invention, the molar proportion of the repeating unit represented by formula (I) based on the total repeating units is 40-80 mol %, preferably 45-70 mol %, and more preferably 50-65 mol %.

Examples of monomers which provide the repeating unit represented by formula (II) are 4,4'-dihydroxybiphenyl as well as ester forming derivatives such as acyl derivatives thereof.

Examples of monomers which provide the repeating unit represented by formula (III) are hydroquinone, resorcin as well as ester forming derivatives such as acyl derivatives thereof.

In the wholly aromatic liquid-crystalline polyester of the present invention, the molar proportion of the repeating unit represented by formula (II) based on the total amount of the repeating units represented by formulae (II) and (III) is 80-99.9 mol %, preferably 85-99 mol % and more preferably 90-98 mol % in view of good mechanical properties of the resulting wholly aromatic liquid-crystalline polyester. If the molar proportion of the repeating unit represented by formula (II) based on the total amount of the repeating units represented by formulae (II) and (III) is less than 80 mol %, the resulting wholly aromatic liquid-crystalline polyester tends to exhibit poor heat resistance.

Examples of monomers which provide the repeating unit represented by formula (IV) are aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl and alkyl-, alkoxy- or halogen-substituted derivatives as well as ester forming derivatives such as ester derivatives and acid halide thereof.

In the wholly aromatic liquid-crystalline polyester of the present invention, examples of the group "—Ar—" contained in the repeating unit represented by formula (IV) include the following groups:

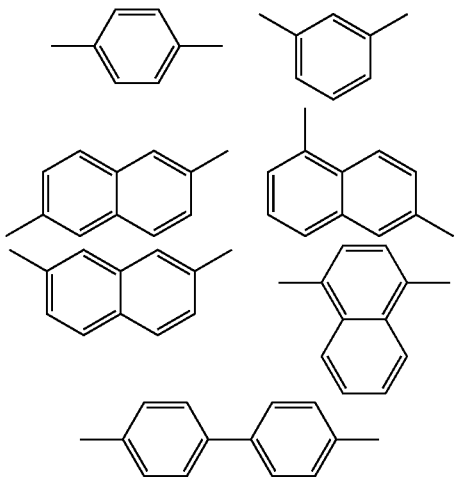

Preferably, the repeating unit represented by formula (IV) is one or more repeating units selected from the group consisting of the repeating units represented by the following formulae (1) to (3) in terms of controlling mechanical properties, heat resistance, melting point and molding properties of the resulting wholly aromatic liquid-crystalline polyester:

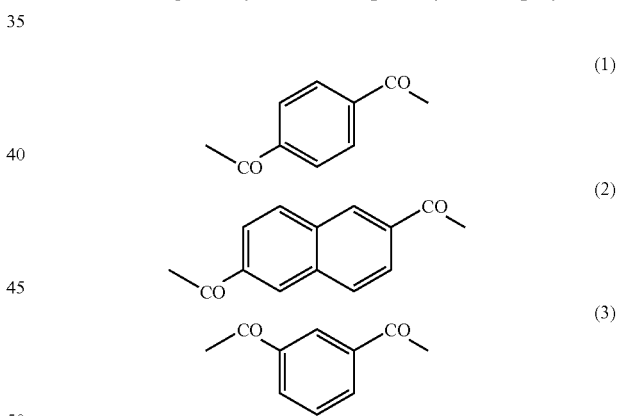

In the wholly aromatic liquid-crystalline polyester of the present invention, the molar ratio of the total amount of the repeating units represented by formulae (II) and (III) (aromatic dioxy repeating units) to the repeating unit represented by formula (IV) (aromatic dicarboxy repeating units) is from 90/100 to 100/90, and preferably 95/100-100/95.

The method for preparing the wholly aromatic liquid-crystalline polyester of the present invention is not limited and any method known to the art can be employed. For example, conventional polymerization methods such as molten acidolysis and slurry polymerization methods for preparing polymer to give ester bonding among the above described monomer components may be employed.

The molten acidolysis method is preferably used for preparing the wholly aromatic liquid-crystalline polyester of the present invention. In this method, the monomers are heated to give molten solution and then the solution is reacted to give the molten polymer. The final step of this method may be carried out under vacuum to facilitate removal of the volatile by-products such as acetic acid or water.

The slurry polymerization method is characterized in that monomers are reacted in a heat-exchange fluid to give solid state polymer in the form of suspension in the heat-exchange liquid medium.

In either of the molten acidolysis method or the slurry polymerization method, the polymerizing monomer may be in the form of lower acyl derivative obtained by acylating the hydroxyl group. The lower acyl group may have preferably 2-5, more preferably 2-3 carbon atoms. Acetylated monomers are most preferably used for the reaction.

The lower acyl derivatives of the monomers may be those prepared beforehand by acylating the monomers independently or may be those produced in the reaction system by adding an acylating agent such as acetic anhydride to the monomers upon preparing the wholly aromatic liquid-crystalline polyester.

In either of the molten acidolysis method or the slurry polymerization method, a catalyst may be used in the reaction, if desired.

Examples of the catalysts include organic tin compounds such as dialkyl tin oxide (ex. dibutyl tin oxide) and diaryl tin oxide; organic titanium compounds such as alkoxy titanium silicate and titanium alkoxide; titanium dioxide; antimony trioxide; alkaline or alkaline earth metal salt of carboxylic acid such as potassium acetate; salts of inorganic acid (ex. $K_2SO_4$); Lewis acid (ex. $BF_3$); and gaseous acid catalysts such as and halogenated hydrogen (ex. HCl).

When a catalyst is used, the amount of the catalyst added to the reaction based on the total monomers may preferably be 10-1000 ppm, and more preferably 20-200 ppm.

The wholly aromatic liquid-crystalline polyester of the present invention may be obtained from the polymerizing reaction vessel in molten state and processed to give pellets, flakes or powders.

Thereafter, the wholly aromatic liquid-crystalline polyester may be subjected to the solid phase heating process in vacuum or under inert gas atmospheres such as nitrogen gas and helium gas in order to improve heat resistance and the like, if desired.

The wholly aromatic liquid-crystalline polyester of the present invention exhibits small dielectric loss tangent in high frequency regions such as gigahertz bands. Specifically, the dielectric loss tangent measured at the frequency of 1 GHz using the stick-shaped test piece with length of 85 mm, width of 1.75 mm and thickness of 1.75 mm is preferably less than or equal to 0.001 and more preferably less than or equal to 0.0008.

The dielectric loss tangent of the wholly aromatic liquid-crystalline polyester of the present invention can be measured by resonant cavity perturbation method.

Further, the Izod impact strength of the wholly aromatic liquid-crystalline polyester of the present invention measured according to ASTM D256 using the bending test piece with length of 64 mm, width of 12.7 mm and thickness of 2.0 mm is preferably greater than or equal to 100 J/m and more preferably greater than or equal to 130 J/m and therefore, it exhibits an excellent Izod impact strength.

The present invention further provides a wholly aromatic liquid-crystalline polyester composition comprising the wholly aromatic liquid-crystalline polyester of the present invention and other ingredients.

The wholly aromatic liquid-crystalline polyester composition of the present invention may be those obtained by admixing one or more inorganic and/or organic filler with the wholly aromatic liquid-crystalline polyester of the present invention.

Examples of inorganic and/or organic fillers may include glass fiber, silica-alumina fiber, alumina fiber, carbon fiber, potassium titanate fiber, aluminium borate fiber, aramid fiber, talc, mica, graphite, wollastonite, dolomite, clay, glass flake, glass beads, glass balloon, calcium carbonate, barium sulfate and titanium oxide. Among them, glass fiber is preferably used because of its good balance of physical properties and cost.

The inorganic and/or organic fillers may be added to the wholly aromatic liquid-crystalline polyester composition of the present invention in an amount of 0.1-200 parts by weight, preferably 1-100 parts by weight per 100 parts by weight of the total weight amount of the wholly aromatic liquid-crystalline polyester.

If the amount of the inorganic and/or organic fillers is more than 200 parts by weight, the moldability of the resulting wholly aromatic liquid-crystalline polyester composition tends to be decreased or the exhausting of the cylinder or die of the molding device tends to be increased.

The wholly aromatic liquid-crystalline polyester or the wholly aromatic liquid-crystalline polyester composition according to the present invention may further be admixed with one or more additives, if desired. For example, molding lubricant such as higher aliphatic acid, higher aliphatic ester, higher aliphatic amide, higher aliphatic acid metal salt, polysiloxane and fluorocarbon resin; colorant such as dyes and pigments; antioxidant; thermal stabilizer; UV absorbent; antistatic agent; and surface active agent may be admixed. The term "higher" group herein used refers to the group of 10-25 carbon atoms.

Molding lubricants such as higher aliphatic acid, higher aliphatic ester, higher aliphatic acid metal salt or fluorocarbon-type surfactant may be added to the pellets of the wholly aromatic liquid-crystalline polyester or the wholly aromatic liquid-crystalline polyester composition before subjecting the pellets to the molding process, so that the agent adhere to the outer surface of the pellet.

The wholly aromatic liquid-crystalline polyester or the wholly aromatic liquid-crystalline polyester composition of the present invention may comprise one or more additional resin component which can be subjected to processing such as molding at the same range of the temperatures as the wholly aromatic liquid-crystalline polyester of the present invention, unless the additional resin component impairs the object of the present invention. Examples of the additional resin components include thermoplastic resins such as polyamide, polyester, polyacetal, polyphenylene ether and denatured derivatives thereof, polysulfone, polyethersulfone, polyether imide and polyamideimide, and thermosetting resins such as phenol resin, epoxy resin and polyimide resin. The amount of the additional resin components is not limited, and may be determined dependent on the intended property. Typically, such additional resins may be added to the wholly aromatic liquid-crystalline polyester composition in an amount of 0.1-100 parts by weight, preferably 0.1-80 parts by weight per 100 parts by weight of the total weight amount of the wholly aromatic liquid-crystalline polyester.

The wholly aromatic liquid-crystalline polyester composition of the present invention may be obtained by adding the inorganic and/or organic fillers, reinforcements, additives and other resin components to the wholly aromatic liquid-crystalline polyester of the present invention and melt kneading the mixture using a kneading machine such as Banbury mixer, kneader, single screw extruder, twin screw extruder or the like at a temperature of from near Tm to Tm +30° C.

The wholly aromatic liquid-crystalline polyester or the wholly aromatic liquid-crystalline polyester composition of the present invention may be processed in a conventional manner to give molded article, film, sheet, bonded textile and the like. For example, injection molding or extrusion techniques may be preferably used.

The wholly aromatic liquid-crystalline polyester or the wholly aromatic liquid-crystalline polyester composition of the present invention exhibits excellent dielectric properties in high frequency regions as well as good mechanical properties such as impact strength and therefore, is suitably used for manufacturing electronic parts of antenna, connector, substrate and the like which use high frequency signals.

The present invention is further described in reference to the following Examples.

EXAMPLE

In the Examples and Comparative Examples, melting temperature (Tm), deflection temperature under load (DTUL), tensile strength, flexural strength, Izod impact strength, and dielectric loss tangent (tan δ) are assessed by the following procedures.

1) Melting Temperature (Tm)

The differential scanning calorimeter Exstar 6000 (Seiko Instruments Inc., Chiba, Japan) or the same type of DSC device is used. The LCP sample to be examined is heated from a room temperature at a rate of 20° C./minute and endothermic peak (Tm1) is recorded. Thereafter, LCP sample is kept at a temperature 20-50° C. higher than Tm1 for 10 minutes. Then the sample is cooled to room temperature at the rate of 20° C./minute. Then, LCP sample is heated again at a rate of 20° C./minute. Endothermic peak found in the final step is recorded as melt point (Tm) of a wholly aromatic liquid-crystalline polyester.

2) Deflection Temperature Under Load (DTUL)

Test piece with length of 127 mm, width of 12.7 mm and thickness of 3.2 mm was molded from a wholly aromatic liquid-crystalline polyester using injection molding machine (UH 1000-110, Nissei Plastic Industrial Co., Ltd). Deflection temperature was measured using the test piece according to ASTM D648 under load of 1.82 MPa and heating rate of 2° C./min.

3) Tensile Strength

A dumbbell-shaped specimen with thickness of 2.0 mm shown in FIG. 1 was molded from a wholly aromatic liquid-crystalline polyester using injection molding machine (MINIMAT M 26/15, Sumitomo Heavy Industries, Ltd.) with a clamping pressure of 15 ton, cylinder temperature of 350° C. and die temperature of 70° C. Tensile strength was measured using the specimen by using INSTRON5567 (Universal testing machine, Instron Japan Co., Ltd.) with span distance of 25.4 mm and pulling rate of 5 mm/min.

4) Flexural Strength

Bending test piece with length of 64 mm, width of 12.7 mm and thickness of 2.0 mm was molded from a wholly aromatic liquid-crystalline polyester using injection molding machine (MINIMAT M26/15, Sumitomo Heavy Industries, Ltd.) with clamping pressure of 15 ton, cylinder temperature of 350° C. and die temperature of 70° C. Flexural strength was measured by three-point bending test using INSTRON5567 (Universal testing machine, Instron Japan Co., Ltd.) with span distance of 40.0 mm and compaction rate of 1.3 mm/min.

5) Izod Impact Strength

Izod impact strength was measured according to ASTM D256 using the same test piece as that used for measuring flexural strength.

6) Dielectric Loss Tangent (Tan δ)

Stick-shaped test piece with length of 85 mm, width of 1.75 mm and thickness of 1.75 mm was molded from a wholly aromatic liquid-crystalline polyester using injection molding machine (PS40, Nissei Plastic Industrial Co., Ltd.). The dielectric loss tangent at 1 GHz was measured using the test piece with vector network analyzer (Agilent Technologies Japan, Ltd.) according to resonant cavity perturbation method.

In the Synthesis Examples and Examples, following abbreviations are used.

[Liquid-Crystalline Polyester Resin Monomer]
BON6:6-hydroxy-2-naphthoic acid
BP: 4,4'-dihydroxybiphenyl
HQ: hydroquinone
RE: resorcin
TPA: terephthalic acid Example 1

BON6, BP, HQ and TPA were fed in a reaction container equipped with an agitating device with torque-meter and a condenser in the ratio shown in table 1 so that the total monomer amount was 6.5 mol. Then potassium acetate 26.7 mg (22.6 ppm to the total amount of the monomers) and acetic anhydride 1.03 fold moles to the total amount (moles) of hydroxy groups of the monomers were added to the container. The mixture was polymerized under the following condition.

TABLE 1

| Synthesis example 1, monomer ratio | | | | |
|---|---|---|---|---|
| | BON6 | BP | HQ | TPA |
| g | 661.3 | 260.7 | 11.0 | 248.3 |
| mol % | 54 | 21.5 | 1.5 | 23 |

Under the nitrogen atmosphere, the mixture was heated from room temperature to 150° C. over 1 hour and kept at 150° C. for 60 minutes, then heated to 350° C. over seven hours with distilling out the by-product acetic acid. Then the pressure was reduced to 10 mmHg over 90 minutes. When the torque became the predetermined level, the polymerizing reaction was terminated. The resulting polymer was removed from the container, cooled to solidify and crushed by crusher to give pellets of a wholly aromatic liquid-crystalline polyester. As a result, approximately theoretical amount of acetic acid was distilled out.

The melting temperature, deflection temperature under load, tensile strength, flexural strength, Izod impact strength and dielectric loss tangent (1 GHz) measured using the resulting wholly aromatic liquid-crystalline polyester are shown in Table 2.

Examples 2-6

Comparative Examples 1 and 2

Wholly aromatic liquid-crystalline polyesters were obtained by the similar manner to Example 1 except that monomer ratio and the amount of potassium acetate used were changed as shown in Table 2.

The melting temperature, deflection temperature under load, tensile strength, flexural strength, Izod impact strength and dielectric loss tangent (1 GHz) measured using the resulting wholly aromatic liquid-crystalline polyesters are shown in Table 2.

Table 2: Physicalities of the Wholly Aromatic Liquid-Crystalline Polyesters

TABLE 2

|  |  | Example |  |  |  |  |  | Comparative Example |  |
|---|---|---|---|---|---|---|---|---|---|
|  |  | 1 | 2 | 3 | 4 | 5 | 6 | 1 | 2 |
| Mo- | BON6 | 54 | 54 | 54 | 54 | 60 | 60 | 60 | 56 |
| no- | BP | 21.5 | 22 | 21 | 21 | 19 | 18 | 20 | 22 |
| mer | HQ | 1.5 | 1 | 2 | — | 1 | — | — | — |
| ratio | RE | — | — | — | 2 | — | 2 | — | — |
| (mol %) | TPA | 23 | 23 | 23 | 23 | 20 | 20 | 20 | 22 |
| BP/(BP + HQ + RE) (mol %) |  | 93.5 | 95.7 | 91.3 | 91.3 | 95.2 | 90.9 | 100 | 100 |
| potassium acetate (ppm) |  | 22.6 | 100 | 10 | 10 | 10 | 10 | 10 | 100 |
| Tm (° C.) |  | 343 | 349 | 338 | 340 | 342 | 334 | 335 | 355 |
| DTUL (° C.) |  | 307 | 331 | 307 | 305 | 330 | 302 | 312 | 341 |
| Tensile strength (MPa) |  | 271 | 246 | 237 | 257 | 241 | 237 | 49 | 107 |
| Flexural strength (MPa) |  | 203 | 207 | 193 | 201 | 211 | 208 | 107 | 163 |
| Izod (J/m) |  | 151 | 156 | 135 | 154 | 138 | 146 | 13 | 40 |
| tan δ (×10$^{-3}$)* |  | 0.5 | 0.5 | 0.6 | 0.6 | 0.4 | 0.5 | 0.4 | 0.5 |

*Value measured at 1 GHz.

The wholly aromatic liquid-crystalline polyesters of Examples 1 to 6 which contain 90-96 mol % of BP based on the total amount of BP, HQ and RE showed superior mechanical properties including tensile strength, flexural strength and Izod impact strength to those of Comparative Examples 1 and 2 which only contain BP as aromatic diol.

The wholly aromatic liquid-crystalline polyesters of Examples 1-6 exhibited small dielectric loss tangent like those of Comparative Examples. The wholly aromatic liquid-crystalline polyester of the present invention exhibited good mechanical properties without impairing dielectric properties.

Comparative Example 3

BON6 (80 mol %), BP (9 mol %), HQ (1 mol %) and TPA (10 mol %) were fed in a reaction container equipped with an agitating device with torque-meter and a condenser so that the total monomer amount was 6.5 mol. Though the polymerization reaction was carried out in the same manner as Example 1, the wholly aromatic liquid-crystalline polyester could not be obtained because the content of the reaction container became too aggregated to carry out agitation at temperatures around 160° C.

What is claimed is:

1. A wholly aromatic liquid-crystalline polyester consisting of the repeating units represented by formulae (I), (II), (III) and (IV):

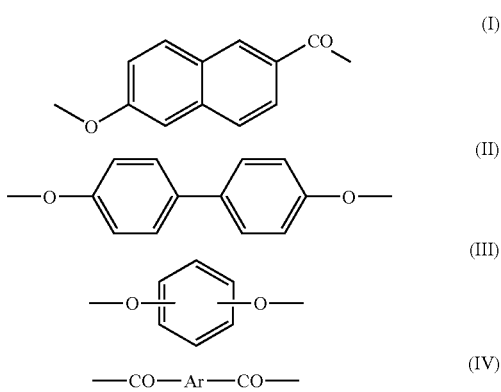

—CO—Ar—CO— (IV)

wherein:
the molar proportion of the repeating unit represented by formula (I) based on the total repeating units constituting the wholly aromatic liquid-crystalline polyester is 40-80 mol %;
the molar ratio of the total amount of the repeating units represented by formulae (II) and (III) to the repeating unit represented by formula (IV) is from 90/100 to 100/90;
the molar proportion of the repeating unit represented by formula (II) based on the total amount of the repeating units represented by formulae (II) and (III) is 90-98 mol%; and
the two "—O—" attached to the benzene ring in formula (III) are positioned meta or para to each other and "Ar" in formula (IV) represents a bivalent aromatic group;
wherein the repeating unit represented by formula (IV) is one or two repeating units selected from the group consisting of the repeating units represented by the following formulae (1) and (3):

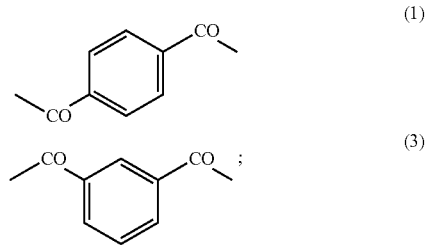

and wherein:
the Izod impact strength of said wholly aromatic liquid-crystalline polyester measured according to ASTM D256 using the bending test piece with length of 64 min, width of 12.7 mm and thickness of 2.0 mm is greater than or equal to 100 J/m.

2. The wholly aromatic liquid-crystalline polyester according to claim 1, wherein the molar proportion of the repeating unit represented by formula (II) based on the total amount of the repeating units represented by formulae (II) and (III) is 90.9-95.7 mol%.

3. The wholly aromatic liquid-crystalline polyester according to claim 1, wherein the dielectric loss tangent measured at the frequency of 1 GHz using the stick-shaped test piece with length of 85 mm, width of 1.75 mm and thickness of 1.75 mm is less than or equal to 0.001.

4. A wholly aromatic liquid-crystalline polyester composition comprising 100 parts by weight of the wholly aromatic liquid-crystalline polyester according to claims 1 and 0.1-200 parts by weight of at least one inorganic and/or organic filler.

5. The wholly aromatic liquid-crystalline polyester composition according to claim 4, wherein the inorganic and/or organic filler is selected from the group consisting of glass fiber, silica-alumina fiber, alumina fiber, carbon fiber, potassium titanate fiber, aluminum borate fiber, aramid fiber, talc, mica, graphite, wollastonite, dolomite, clay, glass flake, glass beads, glass balloon, calcium carbonate, barium sulfate, titanium oxide and a combination thereof.

6. The wholly aromatic liquid-crystalline polyester composition according to claim 5, wherein the inorganic filler is glass fiber.

7. A molded article obtained by molding the wholly aromatic liquid-crystalline polyester according to claim 1.

8. The molded article according to claim 7 which is antenna, connector or substrate.

9. A molded article obtained by molding the wholly aromatic liquid-crystalline polyester composition according to claim 4.

* * * * *